United States Patent [19]

Spokas

[11] 3,851,248

[45] Nov. 26, 1974

[54] VIBRATING FIBER ELECTROMETER

[75] Inventor: John J. Spokas, Lisle, Ill.

[73] Assignee: The United States of America as represented by the United States Atomic Energy Commission, Washington, D.C.

[22] Filed: Aug. 17, 1973

[21] Appl. No.: 389,288

[52] U.S. Cl. .............................. 324/109, 324/99 R

[51] Int. Cl. .............................................. G01r 5/28

[58] Field of Search ........... 324/109, 99 R, 72, 99 D

[56] References Cited

UNITED STATES PATENTS

| | | | |
|---|---|---|---|
| 2,794,955 | 6/1957 | Rich | 324/109 |
| 2,942,187 | 6/1960 | Erath et al. | 324/99 R |
| 3,427,540 | 2/1969 | Exworthy | 324/109 |
| 3,612,990 | 10/1971 | Del Duca | 324/109 |

*Primary Examiner*—Alfred E. Smith
*Assistant Examiner*—Ernest F. Karlsen
*Attorney, Agent, or Firm*—John A. Horan; Arthur A. Churm; Paul A. Gottlieb

[57] ABSTRACT

Improved operation of a vibrating fiber electrometer having a flexible conductive fiber positioned between two deflecting electrodes is achieved by maintaining the pressure of the atmosphere surrounding the fiber at a value where the ratio of the amplitude of vibration of the fiber at its resonance frequency to the amplitude of vibration at twice the resonance frequency is equal to or greater than 5 and having an alternating voltage of frequency equal to the natural frequency of the fiber applied to the deflecting electrodes. Automatic, continuous operation of the vibrating fiber electrometer is attained by projecting the image of the fiber onto a photosensitive detector which develops a signal corresponding to the phase of vibration of the fiber. A servo system coupled to the fiber and the deflecting electrodes and the detector is responsive to the signal to minimize automatically the vibration of the fiber.

3 Claims, 6 Drawing Figures

E
F
G
H
30
34
200
400
600
800
FREQUENCY OF A-C VOLTAGE APPLIED TO DEFLECTING ELECTRODES
AMPLITUDE—ARBITRARY UNITS

60 CPS REFERENCE VOLTAGE
RECORDER
MOTOR
SERVO
POTENTIAMETER
59
A
A.C. VOLTAGE SOURCE
SIGNAL INPUT
LIGHT SOURCE

VIBRATING FIBER ELECTROMETER

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

The vibrating fiber electrometer or Shonka electrometer, U.S. Pat. No. 3,133,248, includes a flexible conductive fiber cantilevered on a fixed input electrode. The tip of the fiber is positioned centrally in the gap between the ends of two fixed deflecting electrodes with the electrodes and the fiber coplanar.

In practice, an A-C voltage of generally 60 cps is applied to the deflecting electrodes so that the potential of each electrode is 180° out of phase with the other electrode but of equal absolute magnitude with the other electrode at several hundred volts peak amplitude. This produces a relatively intense alternating electric field at the end of the fiber generally perpendicular to the fiber's axis. Thus, if there is a net charge on the fiber, it will be driven into vibration between the deflecting electrodes. The presence of a charge on the fiber is thereby indicated by a corresponding vibration of the fiber.

Undesirable charges from spurious sources may appear on the fiber causing unwanted vibrations. One type of undesirable charge is that induced by the deflecting electrodes. Each deflecting electrode is a radiator of an electric field in which is placed the conductive fiber. The effect of each deflecting electrode is to induce charges to congregate at the tip of the fiber opposite to the polarity of the field for that electrode. It is for this reason that there are two deflecting electrodes. If each is of equal absolute magnitude and 180° out of phase, the net induced charge on the fiber will be zero. Any imbalance in voltage levels between the deflecting electrodes will produce a net charge on the fiber not equal to zero and cause spurious vibration. To insure balance the prior art electrometer is provided with an "A-C balance" and a "phase" control for ensuring equal magnitude of electrode potential. Note that due to the inherent qualities of electrical devices these controls must be continually monitored.

Generally, the electrometer is used as a null detector. In the null mode a compensating voltage derived from a potentiometer is applied simultaneously and equally to the fixed deflecting electrodes to compensate for any detected charge on the fiber. Alternatively, the compensating voltage may be added in series with the signal being applied to the input electrode upon which is mounted the fiber. In either case, the compensating voltage is adjusted until no vibration occurs, with the amount of compensating voltage being related to the charge. In normal operation, each time a signal is detected, causing a chargeinduced vibration of the fiber, the compensating voltage must be manually adjusted, thereby limiting the electrometer to discrete readings.

It is therefore an object of this invention to eliminate the need for "A-C balance" and "phase" controls from the vibrating fiber electrometer.

Another object of this invention is to provide for automatic, continuous operation of the vibrating fiber electrometer.

SUMMARY OF THE INVENTION

A vibrating fiber electrometer includes a flexible conductive fiber positioned between two fixed deflecting electrodes, with the two deflecting electrodes having an alternating voltage applied to each so that each deflecting electrode is 180° out of phase with the other electrode. Operation of the electrometer without the necessity of balancing out induced charge on the fiber and greater sensitivity is achieved by operation with the atmosphere surrounding the fiber maintained at a pressure of value where the ratio of the amplitude of vibration of the fiber at its resonance frequency to the amplitude of vibration at twice the resonance frequency is greater than or equal to 5 and with the frequency of the alternating voltage applied to the deflecting electrodes being equal to the natural frequency of vibration of the fiber. Automatic and continuous operation of the electrometer is provided by projecting the image of the fiber onto a photoconductive element which develops a signal corresponding to the phase of vibration of the fiber. Coupled to the photoconductive element and to the fiber and the deflecting electrodes is a servo system which is responsive to the signal developed by the photoconductive element to minimize automatically fiber vibration.

DETAILED DESCRIPTION OF THE INVENTION

Figure 1:
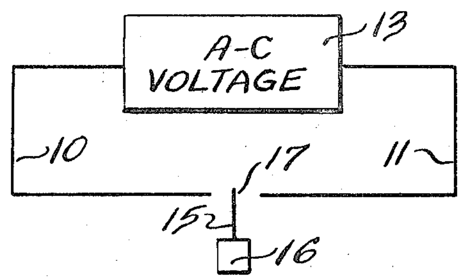
FIG. 1 is a representation of the spatial relationship of the elements of a vibrating fiber electrometer.

Referring to FIG. 1, there is shown the spatial relationship of the elements of the vibrating fiber electrometer. Deflecting electrodes 10 and 11 are coupled to A-C voltage source 13. Fiber 15 is generally cantilever mounted on and coupled to input electrode 16 and its tip 17 is positioned between electrodes 10 and 11. For example, in electrometers using the features of this invention, fiber 15 was approximately 3 mm. long and 4 microns thick, and was made of quartz coated with a conductive material such as gold. The fiber was sufficiently flexible so that it could vibrate. The elements of a vibrating fiber electrometer are more particularly described in U.S. Pat. No. 3,133,248.

Figure 2:
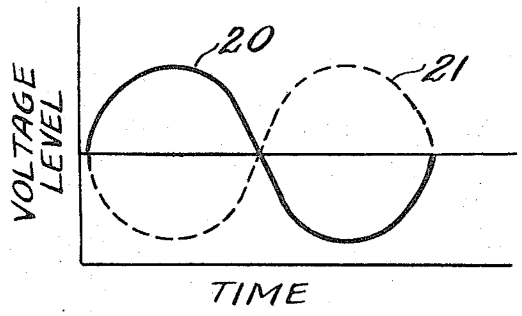
FIG. 2 is a curve of the potentials of the deflecting electrodes in a balanced condition.

In operation, A-C voltage source 13 supplies an A-C voltage of particular frequency to deflecting electrodes 10 and 11, which alternately reverses the polarity on deflecting electrodes 10 and 11 according to the particular frequency of the applied voltage. Thus, the voltage level of deflecting electrode 10 ideally will be 180° out of phase with the voltage level of deflecting electrode 11. In response to the applied A-C voltage each deflecting electrode produces an alternating electric field at the tip 17 of fiber 15. Since fiber 15 is a conductive fiber, the effect on fiber 15 due to the presence of an electric field generated by deflecting electrode 10 is to induce a charge at the tip 17 of opposite polarity to that of the electric field and to then attract fiber 15 to deflecting electrode 10. The same effect results from the electric field generated by deflecting electrode 11. The prior art method of operating the electrometer required the electric field produced by each deflecting electrode by maintained equal in absolute magnitude and 180° out of phase, as shown in FIG. 2, to eliminate induced charges on fiber 15 by creating a net zero field at tip 17. Curve 20 is a curve of the A-C voltage applied to deflecting electrode 10 and curve 21 is the A-C voltage applied to deflecting electrode 11. When the magnitude and the phase of the A-C voltages applied to the deflecting electrodes are balanced, the net induced charge on fiber 15 due to the electric fields produced by deflecting electrodes 10 and 11 will be zero.

Figure 3:
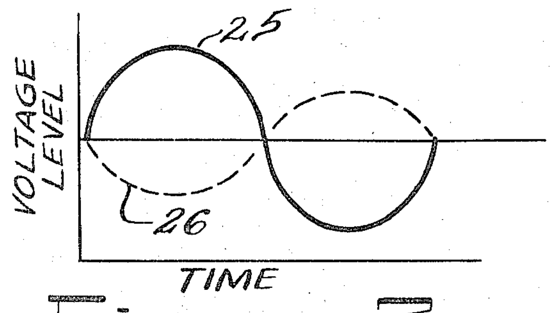
FIG. 3 and FIG. 4 are curves of the potentials of the deflecting electrodes in an unbalanced condition.
Figure 4:
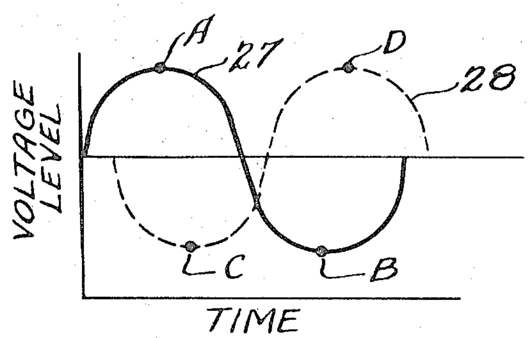

Referring to FIGS. 3 and 4, there is shown a graphical representation of conditions of imbalance which may exist between the voltage levels of deflecting electrodes 10 and 11. Curves 25 and 27 represent the response of deflecting electrode 10 and curves 26 and 28 represent the response of deflecting electrode 11. In FIG. 3 the imbalance results from deflecting electrode 10 having a greater voltage amplitude swing than deflecting electrode 11. Since the sum of electric fields at tip 17, assuming it is centered between the deflecting electrodes, will not be zero, a charge will be induced at tip 17 opposite in polarity from that of deflecting electrode 10, and tip 17 will be attracted to deflecting electrode 10. One-half cycle later when the polarity of deflecting electrode 10 is reversed, the induced charge at tip 17 will also be reversed and tip 17 will again be attracted to deflecting electrode 10. Thus, the frequency of vibration of fiber 15 due to the induced charge caused by the amplitude imbalance illustrated in FIG. 3 will be twice the frequency of the applied A-C voltage to deflecting electrodes 10 and 11. To correct this problem, the prior art electrometer included an "A-C balance" control to equalize the absolute amplitudes of deflecting electrodes 10 and 11. Note also that if fiber 15 is not centered between deflecting electrodes 10 and 11 an imbalance will occur which will also require the use of the "A-C balance" control of the prior art.

In FIG. 4 the imbalance results from slight phase shifts due to the inherent qualities of the electrometer circuitry. The amplitude peaks A and B of curve 27 occur before the corresponding peaks C and D of curve 28 so that a net imbalance will occur. At peak A an induced charge will be present at tip 17 due to deflecting electrode 10 having a greater absolute potential than deflecting electrode 11 and tip 17 will be attracted to deflecting electrode 10. This is repeated one-half cycle later at peak B. At peak C an induced charge will be present at tip 17 due to deflecting electrode 11 having a greater absolute potential than deflecting electrode 10 and tip 17 will be attracted to deflecting electrode 11. One-half cycle later, at peak D, this is repeated. Thus the frequency of vibration of fiber 15 due to the induced charge caused by the imbalance illustrated in FIG. 4 will be twice the applied A-C frequency. The prior art electrometer included a "phase" control to eliminate this phase imbalance.

Figure 5:
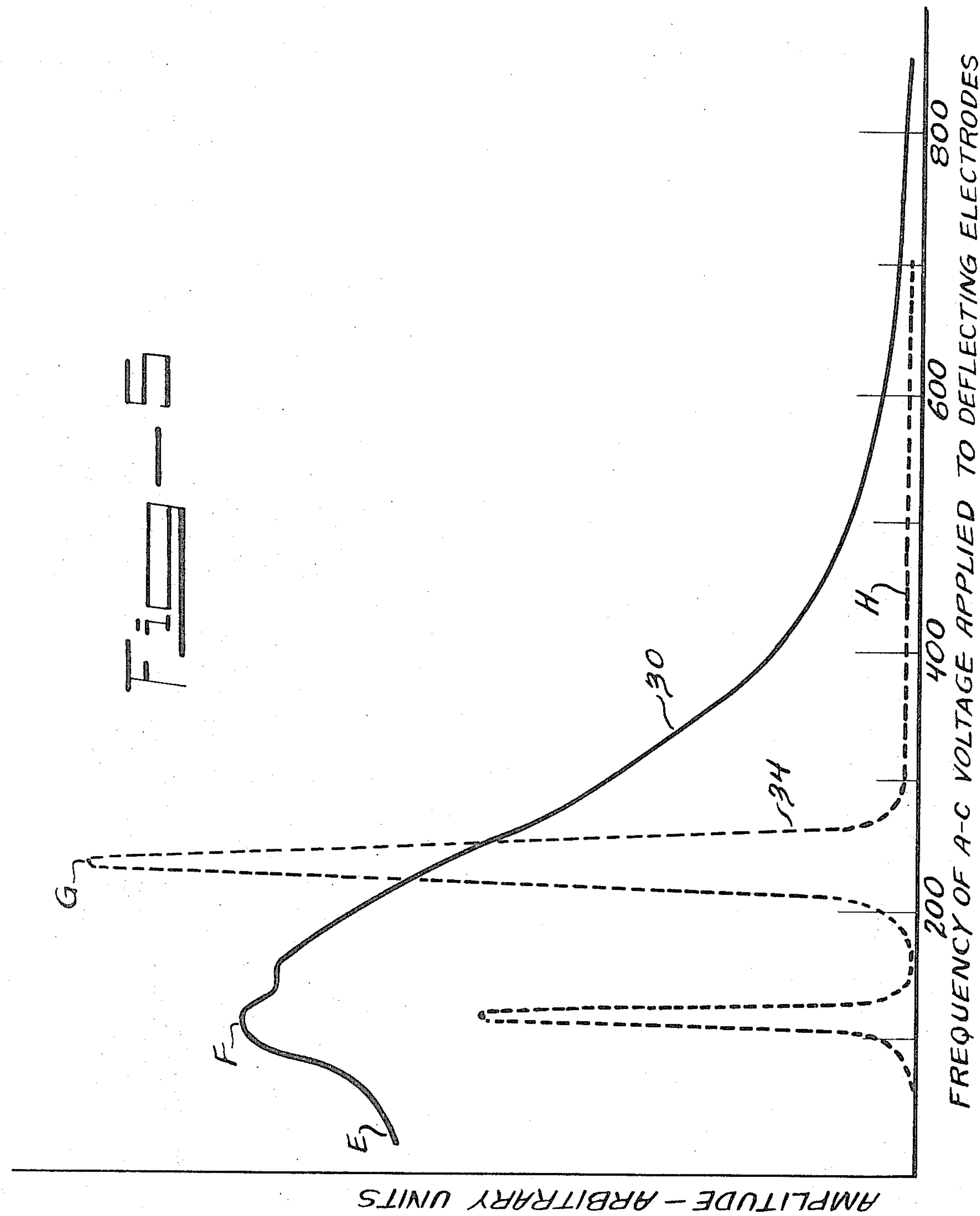
FIG. 5 is a set of curves showing the frequency response of a representative fiber.

Referring to FIG. 5 there is shown the frequency response of a typical fiber, approximately 4 microns thick and 3 mm. long, having a maximum response at natural frequency of vibration of 240 cps. To obtain the response, the fiber was positioned between two deflecting electrodes to which an alternating voltage of varying frequency was applied. Curve 30 shows the response with the pressure of the environment surrounding the fiber at one atmosphere and curve 34 shows the response at a pressure of 1 mm. of mercury. For each curve the response illustrated is in terms of amplitude of vibration and not frequency of vibration of the fiber.

Remembering that fiber variations caused by unbalanced applied A-C voltage conditions will have a frequency of vibration twice the frequency of the applied A-C voltage, consider curve 30. Under the prior art practice of operation at 60 cps, it can be seen that the amplitude of vibrations at 60 cps at point E on curve 30 are much less than the amplitude of vibrations at 120 cps at point F on curve 30. If there is an induced charge on the fiber caused by an imbalance, vibrations associated with the induced charge, which will occur at 120 cps, will overshadow vibrations associated with charges applied at the input which occur at 60 cps since the fiber's amplitude of response is much greater at 120 cps. Thus, for an electrometer operating according to prior art practice, it is necessary that no imbalance in the applied A-C voltage be permitted, and the "A-C balance" and "phase" controls are indispensable.

Consider the frequency response of a typical fiber at 1 mm. of mercury as shown by curve 34. Reducing the pressure reduces the damping effect on fiber vibration caused by the atmosphere so that distinct amplitude peaks appear in the response of the fiber. At the resonance peak of 240 cps at point G on curve 34 the amplitude of response is significantly greater than that at any other frequency. Therefore, if the applied A-C voltge on deflecting electrodes 10 and 11 is at 240 cps and the pressure is at 1 mm. of mercury, the amplitude of the applied A-C voltage can be reduced as much as tenfold over that needed at one atmosphere of pressure to achieve the same amplitude of vibration, and thus the same charge sensitivity of the electrometer. Also, at an applied A-C voltage of 240 cps, if there happens to be a net non zero induced on the fiber by an unbalanced applied A-C voltage, vibrations of the fiber will be at twice the frequency of the applied A-C voltage. This would be 480 cps as shown at point H on curve 34. At 480 cps the response of the fiber in terms of amplitude of vibration is several orders of magnitude less than that at the natural frequency of the fiber at point G on curve 34. Therefore, no detectable motion of the fiber will result due to induced charge on the fiber caused by an unbalanced applied A-C voltage. In an electrometer employing a typical fiber, and operating with the A-C voltage applied to the deflecting electrodes at the natural frequency of the fiber and at a pressure of the atmosphere surrounding the fiber at 1 mm. of Hg, the need for removing such imbalance is negated and the "A-C balance" and "phase" controls of the prior art electrometer become extraneous.

As the pressure is reduced below 1 mm. the fiber response ratio, which is the ratio of the maximum amplitude of vibration of the fiber at the resonance frequency of the amplitude of vibration of the fiber at twice the resonance frequency, increases, and as the pressure is increased above 1 mm. the fiber response ratio decreases. Elimination of the need for "A-C balance" and "phase" controls is realized when the fiber response ratio is equal to or greater than 5. At this ratio the amplitude of vibrations of the fiber at twice the resonance frequency will not materially distort the electrometer response.

Figure 6:
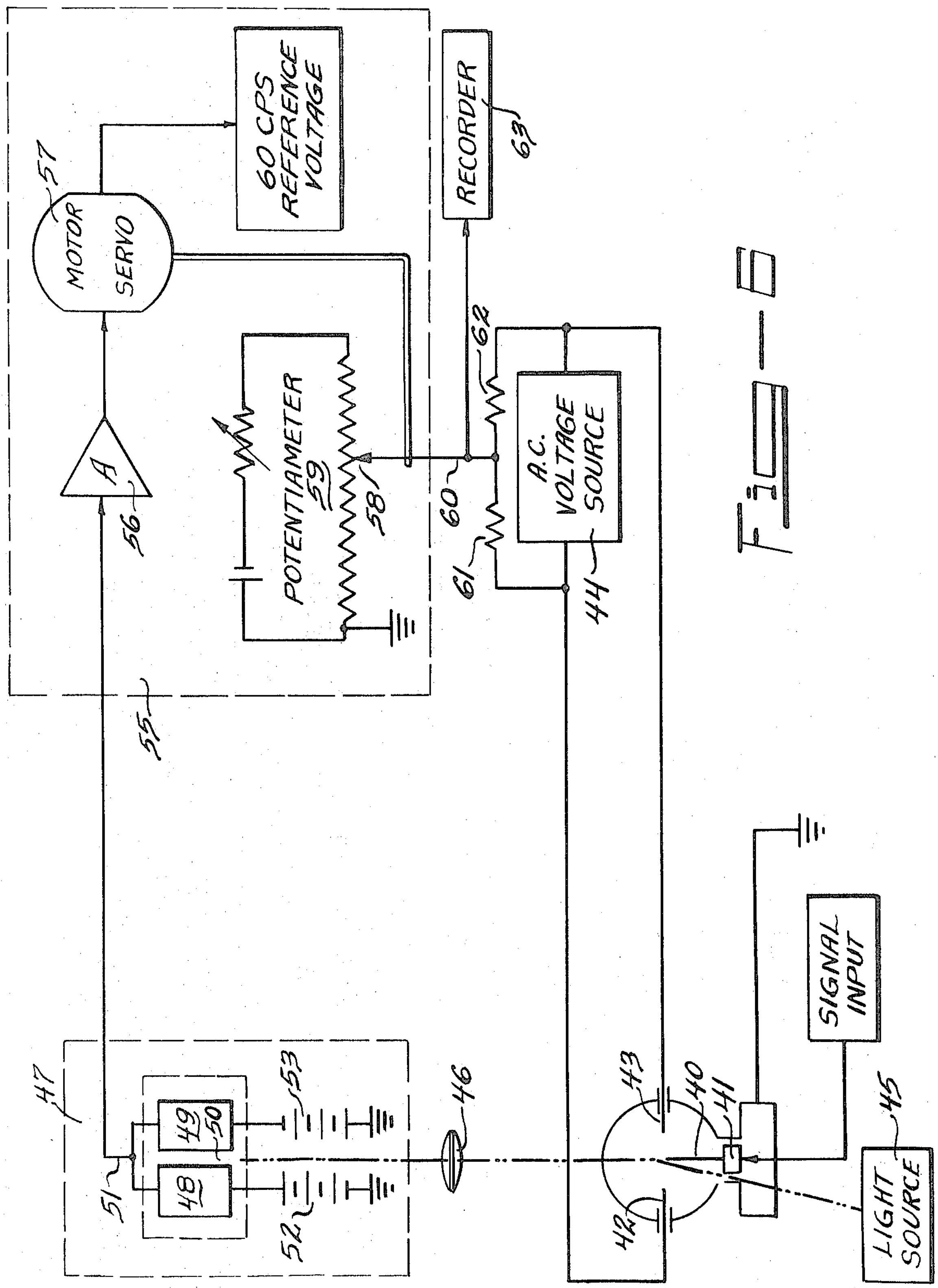
FIG. 6 is a schematic of the automatic compensating system.

Referring to FIG. 6 there is shown an apparatus for providing continuous automatic operation of the vibrating fiber electrometer. Conductive fiber 40 is cantilever mounted on input electrode 41. Fiber 40 is centrally located between deflecting electrodes 42 and 43 which are coupled to an A-C voltage source 44. When a charge to be detected is applied to fiber 40 via input electrode 41, fiber 40 vibrates at the frequency of an applied alternating electric field resulting from an A-C voltage being applied to deflecting electrodes 42 and 43 by A-C voltage source 44. To provide continuous operation of the electrometer it is necessary for a compensating D-C voltage to be applied either to deflecting electrodes 42 and 43 or fiber 40 to balance out the applied input charge and stop the fiber from vibrating. The value and polarity of the compensating voltage is a measure of the charge on the fiber.

The amplitude of vibration reflects the magnitude of charge on the fiber. However, the phase of vibration depends only on the polarity of the charge on the fiber. Consider the condition when the fiber carries a positive charge. If the polarity of deflecting electrode 42 at that instant is positive and the polarity of deflecting electrode 43 is negative, the fiber will experience a force toward electrode 43. Half a cycle later when the polarity of deflecting electrodes 42 and 43 is reversed, the fiber will experience a force in the direction of electrode 42. If the fiber carries a negative charge, everything repeats as before except the fiber will be attracted to the deflecting electrode of opposite polarity than when the fiber carried a positive charge. Thus the only difference is that the phase of vibration is shifted by 180° relative to the vibration resulting from a positive charge. Therefore, the phase of vibration carries the information concerning the polarity of charge existing on the fiber and hence the polarity of compensating voltage necessary to null the charge on the fiber. If the existing charge is positive, the fiber will vibrate as described above, 180° out of phase with vibration associated with a negative charge, and a negative compensating voltage should be applied to the fiber or one of the electrodes to null the charge on the fiber.

The disclosed device is a means of detecting this phase as well as the existence of vibration and using that information to apply automatically the proper compensating voltage to eliminate fiber vibration. Using light source 45 and lens 46, the image of fiber 40 is projected onto a photoconductive device 47. Photoconductive device 47 includes two photoelectric cells 48 and 49 which are otherwise identical. The two cells 48 and 49 are deposited side by side on the same substrate with an approximately 0.05 inch gap 50 therebetween. This double cell is placed in the focal plane of the objective of lens 46 so that the image of fiber 40 at rest is projected onto and coincides with gap 50. When fiber 40 is vibrating its image will alternately move across cell 48 and then cell 49 according to the phase of vibration. Cells 48 and 49 have a common electrode 51. The other electrode of cell 48 is held at positive potential by battery 52, while the other electrode of cell 49 is held at an equal negative potential by battery 53. In this manner, the sign of the output signal at electrode 50 indicates upon which cell the image is encroaching. Therefore, when the fiber is vibrating, the output signal produced by photoconductive device 47 will be an alternating signal synchronized precisely with the motion of the fiber. The phase of the output thus indicates the sign of the charge on the fiber giving rise to its vibration.

The output of photoconductive device 47 is applied to automatic control system 55, where it is amplified by amplifier 56 and then impressed on the reference windings of servo motor 57 which may be of the type found in a recording potentiometer. Servo motor 57 drives a sliding contact 58 of a slide wire potentiometer 59 and the output of potentiometer 59 provides the compensating D-C potential for the electrometer, since it is coupled to A-C voltage source 44 via lead 60 and resistors 61 and 62. The action of servo motor 57 driving sliding contact 58 varies the D-C output of potentiometer 59. The effect of the D.C., generated by potentiometer 59 and coupled to A-C voltage source 44 and deflecting electrodes 10 and 11, is to induce a charge on one deflecting electrode while the other is held constant to negate the vibration of the charged fiber. The output of potentiometer 59 is also coupled to a recording potentiometer or strip chart recorder 63 which provides a record of the compensating voltage applied to deflecting electrodes 42 and 43. In this manner, an automatic, continuous record of compensating voltages is maintained, thereby indicating continuously and automatically the charge present on the fiber.

If, alternatively, the compensating D-C is to be applied to the fiber, then the output of potentiometer 59 would be coupled in series to fiber 40. It is apparent that for a charge to collect on the free end of one of the deflecting electrodes or on the free end of the fiber to balance out the applied charge, there must be another conductive surface or electrode upon which charge is stored to form the completed circuit. This is analogous to charging a capacitor where charge is applied to one plate and, although no current flows directly from plate to plate, a charge will appear at the other plate. The fiber is the other electrode which forms the path to complete the circuit for charge applied to a deflecting electrode and vice versa. Therefore, it is permissible to describe the coupling of the potentiometer to the electrometer by saying that it is coupled to and the compensating D.C. is applied to both the deflecting electrodes and the fiber, as each is necessary for the D.C. to be applied to provide a complete circuit for the balancing of applied charges.

Note that a photoconductive element signal of one phase drives the servo motor in one direction, while a signal of the opposite phase causes the reverse rotation of the motor. Thus, a compensating potential is produced of the appropriate polarity to offset the signal on the fiber causing it to vibrate. As long as the fiber is vibrating, there will be a net torque out of the servo motor until precisely the correct compensating voltage is developed by the balancing potentiometer.

The embodiments of the invention in which an exclusive property or privilege is claimed are defined as follows:

1. A method of operating a vibrating fiber electrometer having a pair of electrodes and a conductive flexible fiber having a charge applied thereto, said fiber being positioned between said electrodes being free to vibrate therebetween and having a particular natural mechanical resonance frequency, including the steps of:

a. maintaining the pressure of the atmosphere surrounding said fiber at a value wherein the ratio of the amplitude of vibration of said fiber at the natural mechanical resonance frequency to the amplitude of vibration of said fiber at twice the natural mechanical resonance frequency is equal to or greater than 5, and b. applying a first alternating voltage to said electrodes with the frequency of said first alternating voltage being equal to said natural mechanical resonance frequency of said fiber.

2. The method of claim 1 further including the steps of:

a. projecting the image of said fiber onto a photosensitive detector, b. with said fiber vibrating, developing a second alternating voltage by said photosensitive detector corresponding in phase to the phase of fibration of said fiber, and c. in response to said second alternating voltage, applying to said fiber and said electrodes a D-C voltage of value sufficient to minimize vibrations of said fiber.

3. The method of claim 1 wherein said fiber is made of quartz coated with a conductive substance and is approximately 3 mm. long and 4 microns thick and the pressure of the atmosphere surrounding said fiber is maintained at a value less than or equal to 1 mm. of mercury.

* * * * *